(12) United States Patent
Eki et al.

(10) Patent No.: US 11,778,345 B2
(45) Date of Patent: Oct. 3, 2023

(54) INFORMATION PROCESSING DEVICE, INFORMATION PROCESSING METHOD, AND INFORMATION PROCESSING PROGRAM

(71) Applicant: Sony Semiconductor Solutions Corporation, Kanagawa (JP)

(72) Inventors: Ryoji Eki, Kanagawa (JP); Kyoji Yokoyama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 25 days.

(21) Appl. No.: 17/623,879

(22) PCT Filed: Aug. 4, 2020

(86) PCT No.: PCT/JP2020/029765
§ 371 (c)(1),
(2) Date: Dec. 30, 2021

(87) PCT Pub. No.: WO2021/029269
PCT Pub. Date: Feb. 18, 2021

(65) Prior Publication Data
US 2022/0360727 A1    Nov. 10, 2022

(30) Foreign Application Priority Data
Aug. 13, 2019    (JP) .................................. 2019-148674

(51) Int. Cl.
*H04N 25/59* (2023.01)
*H04N 25/75* (2023.01)
(Continued)

(52) U.S. Cl.
CPC ............... *H04N 25/59* (2023.01); *G06N 3/02* (2013.01); *H04N 25/589* (2023.01); *H04N 25/75* (2023.01); *H04N 25/767* (2023.01)

(58) Field of Classification Search
CPC ...... H04N 25/59; H04N 25/589; H04N 25/75; H04N 25/767; H04N 25/533;
(Continued)

(56) References Cited

U.S. PATENT DOCUMENTS

| 2014/0267828 A1* | 9/2014 | Kasai | H04N 23/741 348/229.1 |
| 2018/0227551 A1* | 8/2018 | Shishido | H04N 23/10 |
| 2018/0241929 A1* | 8/2018 | Bouzaraa | G06T 5/009 |

FOREIGN PATENT DOCUMENTS

| JP | 2013-21660 A | 1/2013 |
| JP | 2018-5639 A | 1/2018 |

(Continued)

OTHER PUBLICATIONS

International Search Report and Written Opinion dated Sep. 24, 2020, received for PCT Application PCT/JP2020/029765, Filed on Aug. 4, 2020, 9 pages including English Translation.

*Primary Examiner* — Nhan T Tran
(74) *Attorney, Agent, or Firm* — XSENSUS LLP

(57) ABSTRACT

Provided are an information processing device, an information processing method, and an information processing program capable of reducing a processing load of convolution processing in a convolutional neural network (CNN). An information processing device (1) according to the present disclosure includes a setting unit (51) and a control unit (52). The setting unit (51) sets exposure time of each of imaging pixels in an imaging unit (2), which includes a plurality of imaging pixels arrayed two-dimensionally, to exposure time corresponding to a convolution coefficient of a first layer of a CNN. The control unit (52) causes transfer (Continued)

of signal charges from imaging pixels, which have been exposed, to a floating diffusion (FD), thereby performing convolution processing.

6 Claims, 12 Drawing Sheets

(51) Int. Cl.
*H04N 25/589* (2023.01)
*H04N 25/767* (2023.01)
*G06N 3/02* (2006.01)

(58) Field of Classification Search
CPC ...... H04N 25/778; H04N 25/46; H04N 25/57; H04N 25/76; G06N 3/02; G06N 3/045
See application file for complete search history.

(56) References Cited

FOREIGN PATENT DOCUMENTS

| JP | 2018-125842 A | | 8/2018 | |
|----|---------------|---|--------|---|
| JP | 2018125842 A | * | 8/2018 | ........... H01L 27/307 |
| WO | 2018/159002 A1 | | 9/2018 | |
| WO | 2019/131965 A1 | | 7/2019 | |

* cited by examiner

INFORMATION PROCESSING DEVICE, INFORMATION PROCESSING METHOD, AND INFORMATION PROCESSING PROGRAM

CROSS-REFERENCE TO RELATED APPLICATIONS

The present application is based on PCT filing PCT/JP2020/029765, filed Aug. 4, 2020, and claims priority to Japanese Application No. 2019-148674, filed Aug. 13, 2019, the entire contents of each are incorporated herein by reference.

FIELD

The present disclosure relates to an information processing device, an information processing method, and an information processing program.

BACKGROUND

There are image classification devices that input image data to a convolutional neural network (CNN), repeats convolution processing and pooling processing on the image to extract features of the image, and classifies the image from the features by a fully-connected layer in a subsequent stage (see, for example, Patent Literature 1).

CITATION LIST

Patent Literature

Patent Literature 1: STP 2018-005639 A

SUMMARY

Technical Problem

However, in CNNs, convolution processing is performed on a target pixel by using a plurality of surrounding pixels, and the processing is necessary for all necessary regions. Thus, a processing load required for the convolution processing is very large.

Therefore, the present disclosure proposes an information processing device, an information processing method, and an information processing program capable of reducing the processing load of convolution processing in a CNN.

Solution to Problem

According to the present disclosure, an information processing device is provided. The information processing device includes a setting unit and a control unit. The setting unit sets exposure time of each of imaging pixels in an imaging unit, which includes a plurality of imaging pixels arrayed two-dimensionally, to exposure time corresponding to a convolution coefficient of a first layer of a CNN. The control, unit causes transfer of signal charges from imaging pixels, which have been exposed, to a floating diffusion, thereby performing convolution processing.

DESCRIPTION OF EMBODIMENTS

Hereinafter, embodiments of the present disclosure will be described in detail on the basis of the drawings. Note that in each of the following embodiments, the same parts are denoted by the same symbols, and redundant description will be omitted.

[1. Overview of CNN]

Figure 1:
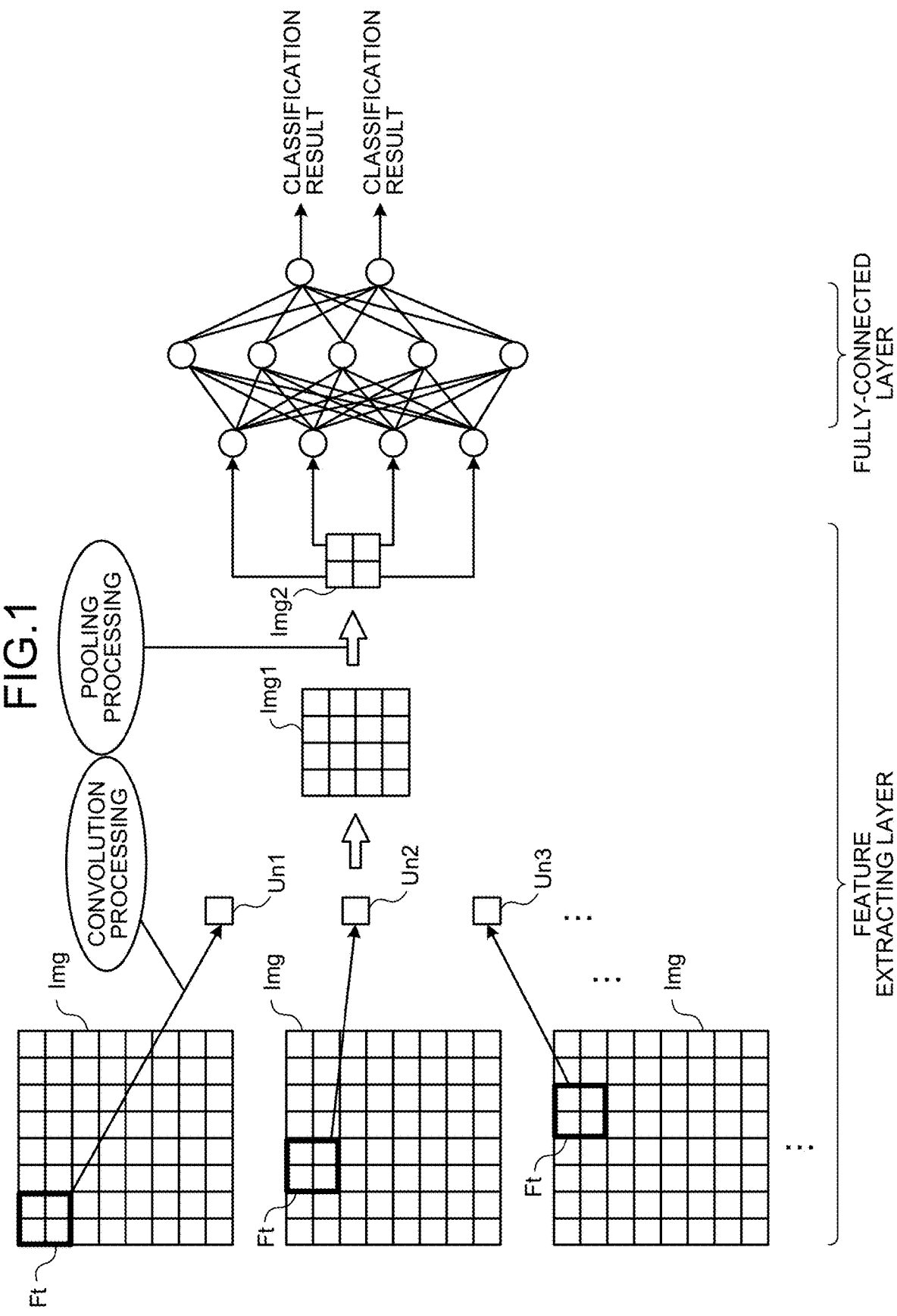
FIG. 1 is a schematic explanatory diagram of a CNN according to the present disclosure.

First, an outline of a convolutional neural network (CNN) will be described by referring to FIG. 1. FIG. 1 is a schematic explanatory diagram of a CNN according to the present disclosure.

A CNN is a machine learning model obtained by combining convolution processing and deep neural network (DNN). As illustrated in FIG. 1, a CNN roughly includes a feature extracting layer as a preceding stage and a fully-connected layer as a subsequent stage.

When image data Img is input, the feature extracting layer performs filter processing on every predetermined number of imaging pixels to degenerate the image data into one pixel and thereby performs convolution processing to generate a feature map Img1 indicating a distribution of features of the image data.

As illustrated in FIG. 1, the image dataing formed by a plurality of imaging pixels arrayed two-dimensionally (in a matrix) is input to the CNN. For example, when 2×2 convolution processing (hereinafter, referred to as "2×2 Conv") is performed, the CNN first extracts a feature by applying a filter Ft to the upper left four imaging pixels in the image data Img and converts the feature into one degenerate pixel Un1.

At this time, the CNN multiplies each pixel value of the four imaging pixels by a convolution coefficient acquired in advance by machine learning and adds the pixel values of the four imaging pixels after the multiplication, thereby calculating the feature of the degenerate pixel Un1.

Here, a pixel value is a value obtained by converting an analog voltage value, corresponding to the amount of received light when a photoelectric conversion element corresponding to each imaging pixel captures an image, into a digital value. The process of converting the predetermined number of imaging pixels into one degenerate pixel Un1 including the feature is convolution processing.

Subsequently, the CNN performs convolution processing by shifting the application position of the filter Ft by two pixels in the lateral direction and converts the four imaging pixels to which the filter Ft is applied into one degenerate pixel Un2.

Furthermore, the CNN further shifts the application position of the filter Ft by two pixels in the lateral direction, performs convolution processing, and converts the four imaging pixels to which the filter Ft is applied into one degenerate pixel Un3. Then, the CNN performs convolution processing on all the imaging pixels included in the image data Img to generate a feature map Img1.

Then, the CNN performs pooling processing on the feature map Img1. In the pooling processing, the CNN selects, for example, a degenerate pixel having the maximum feature for every predetermined number of degenerate pixels (for example, height×width: 2×2) included in the feature map Img1.

Then, the CNN generates a feature map Img2 in which the feature is further extracted and degenerated in the selected degenerate pixels, inputs the features of the pixels of the feature map Img2 to the subsequent fully-connected layer, and classifies the image from the features by the fully-connected layer.

As described above, in the CNN, first, the pixel values of all the imaging pixels of the image data Img that is input are multiplied by the convolution coefficient, the pixel values multiplied by the convolution coefficient are added for every predetermined number of imaging pixels, thereby performing the convolution processing.

Therefore, in the CNN, for example, in a case where image data of several million pixels is input, the calculation amount of the product-sum operation for performing the convolution processing is enormous, which increases the processing load. Therefore, the information processing device according to the present disclosure reduces the processing load of the convolution processing in the CNN by performing the convolution processing performed in the feature extracting layer in the CNN by analog processing by an imaging unit that captures the image.

[2. Configuration of Information Processing Device]

Figure 2:
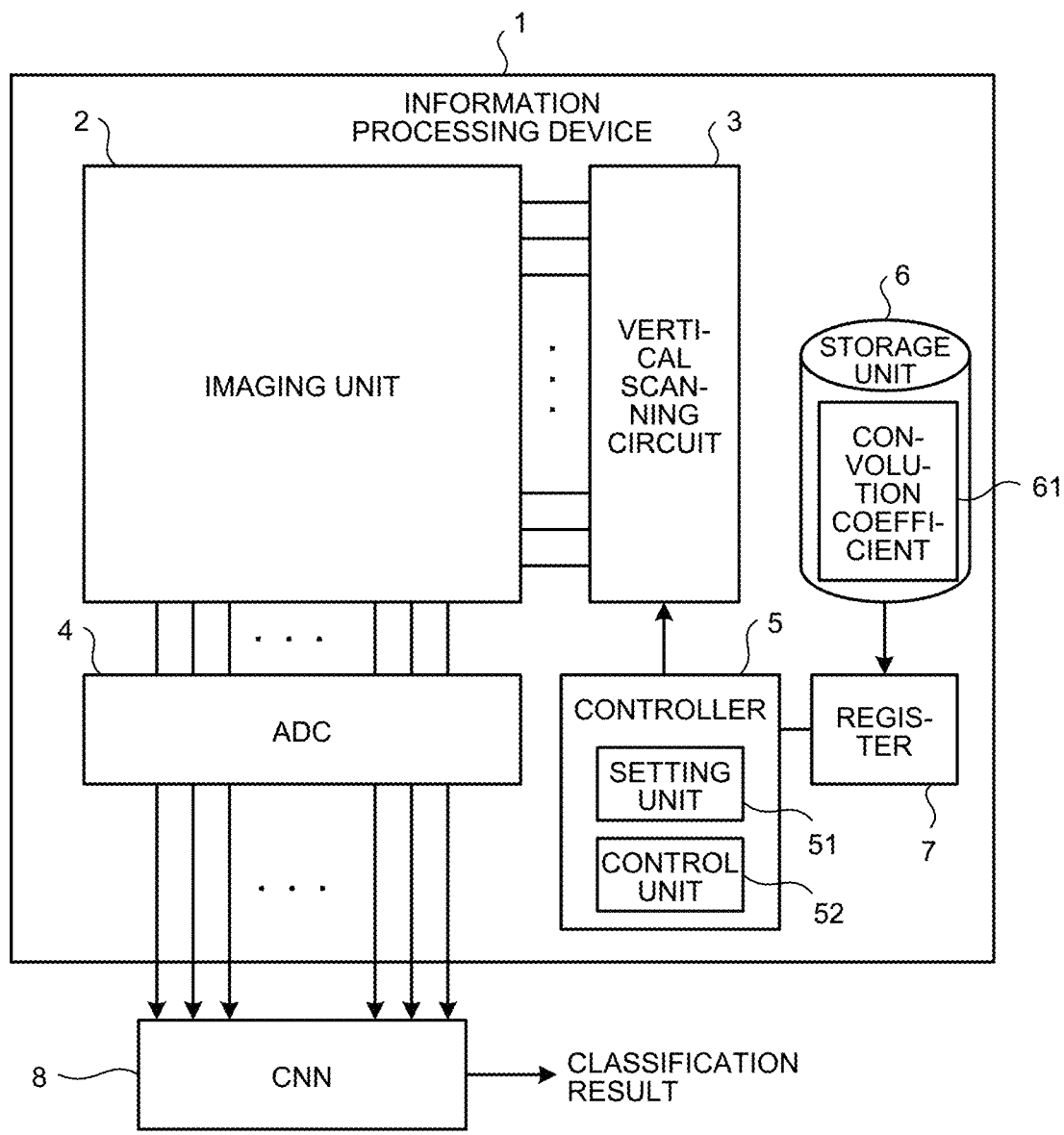
FIG. 2 is a block diagram illustrating an example of a configuration of an information processing device according to the present disclosure.

FIG. 2 is a block diagram illustrating an example of a configuration of an information processing device according to the present disclosure. The information processing device 1 is, for example, a complementary metal oxide semiconductor (CMOS) image sensor and performs convolution processing of a first layer or convolution processing of up to a second layer in a CNN on an image that it captures by analog processing. Then, the information processing device 1 outputs a signal corresponding to a result of the convolution processing to a subsequent layer of a CNN 8. Note that, here, although a case where the information processing device 1 performs the convolution processing in the first layer or the second layer in the CNN will be described, the information processing device 1 may be configured to perform convolution processing in a third layer and subsequent layers in the CNN.

As a result, the CNN 8 can output the classification result of the image by performing the pooling processing or the processing in the fully-connected layer without performing the convolution processing in the first layer or the convolution processing in the second layer. As a result, the information processing device 1 can reduce the processing load of convolution processing in the CNN 8.

Specifically, as illustrated in FIG. 2, the information processing device 1 includes an imaging unit 2, a vertical scanning circuit 3, an analog to digital converter (ADC) 4, a controller 5, a storage unit 6, and a register 7.

The imaging unit 2 includes a plurality of imaging pixels arrayed two-dimensionally and floating diffusions each shared by a predetermined number of imaging pixels. Each imaging pixel includes a photodiode provided corresponding to each pixel of a captured image and photoelectrically converts received light into a signal charge corresponding to the amount of received light. A floating diffusion is a charge holding region that temporarily holds signal charges transferred from photodiodes.

The vertical scanning circuit 3 is controlled by the controller 5 and performs exposure of each imaging pixel, transfer of signal charges to the floating diffusions, reading of pixel signals from the floating diffusions to the ADC 4, and the like. The ADC 4 converts an analog pixel signal input from the imaging unit 2 into a digital pixel signal and outputs the digital pixel signal to the CNN 8.

The controller 5 includes, for example, microcomputer including a central processing unit (CPU), a read only memory (ROM), a random access memory (RAM), and the like, and various types of circuits. The controller 5 includes a setting unit 51 that functions when the CPU executes an information processing program stored in the ROM using the RAM as a work area, and a control unit 52.

The storage unit 6 is, for example, a storage device such as a flash memory and stores a convolution coefficient 61 of the CNN 8 acquired in advance by machine learning. The convolution coefficient 61 read from the storage unit 6 by the controller 5 is set in the register 7.

Note that, some or all of the setting unit 51 and the control unit 52 included in the controller 5 may be configured by hardware such as an application specific integrated circuit (ASIC) or a field programmable gate array (FPGA).

The setting unit 51 and the control unit 52 included in the controller 5 each implement or execute the action of information processing described below. Note that the internal configuration of the controller 5 is not limited to the configuration illustrated in FIG. 2 and may be another configuration as long as information processing described later is performed.

When causing the imaging unit 2 to capture an image, the setting unit 51 reads the convolution coefficient 61 from the storage unit 6, sets the convolution coefficient 61 in the register and sets the exposure time of the imaging pixels in the imaging unit 2 to exposure time corresponding to the convolution coefficient 61 of the first layer of the CNN 8.

At this time, the setting unit 51 sets the exposure start timing of the imaging pixels to different timings corresponding to the convolution coefficient 61 of the first layer of the CNN 8 and sets the transfer timing of signal charges from all the imaging pixels to the floating diffusions to the same timing. An example of such exposure and transfer timing will be described later by referring to FIG. 5.

The control unit 52 causes the imaging unit 2 to capture an image by exposing each imaging pixel on the basis of the exposure start timing and the exposure time set by the setting unit 51. As a result, an imaging pixel having a larger convolution coefficient 61 has a longer exposure time and thus has a larger amount of signal charge that is photoelectrically converted.

As a result, the signal charge amount (analog value) photoelectrically converted by each imaging pixel is obtained by multiplying a signal charge amount, in a case where the exposure time of all the imaging pixels are the same, by the convolution coefficient. Such imaging processing is substantially the same as arithmetic processing of multiplying the pixel value (digital value) of each imaging pixel by the convolution coefficient 61.

Then, the control unit 52 transfers the signal charges from the predetermined number of imaging pixels sharing a floating diffusion to the floating diffusion on the basis of transfer timing set by the setting unit 51.

Such transfer processing is substantially the same as arithmetic processing of adding pixel values of the predetermined number of imaging pixels multiplied by the convolution coefficient 61. That is, the series of processing described above is substantially the same as convolution processing of the first layer of the CNN 8.

Then, the control unit 52 causes the ADC 4 to sequentially read, from the imagine unit 2, the signal charges transferred to the floating diffusions as pixel signals. The ADC 4 converts an analog pixel signal input from the imaging unit 2 into a digital pixel signal and outputs the digital pixel signal to the CNN 8.

As a result, the CNN 8 can output the classification result of the image by performing pooling processing or processing in the fully-connected layer without performing the convolution processing in the first layer on the pixel signals that have been subjected to the convolution processing.

[3. 2×2 Conv]

Figure 3:
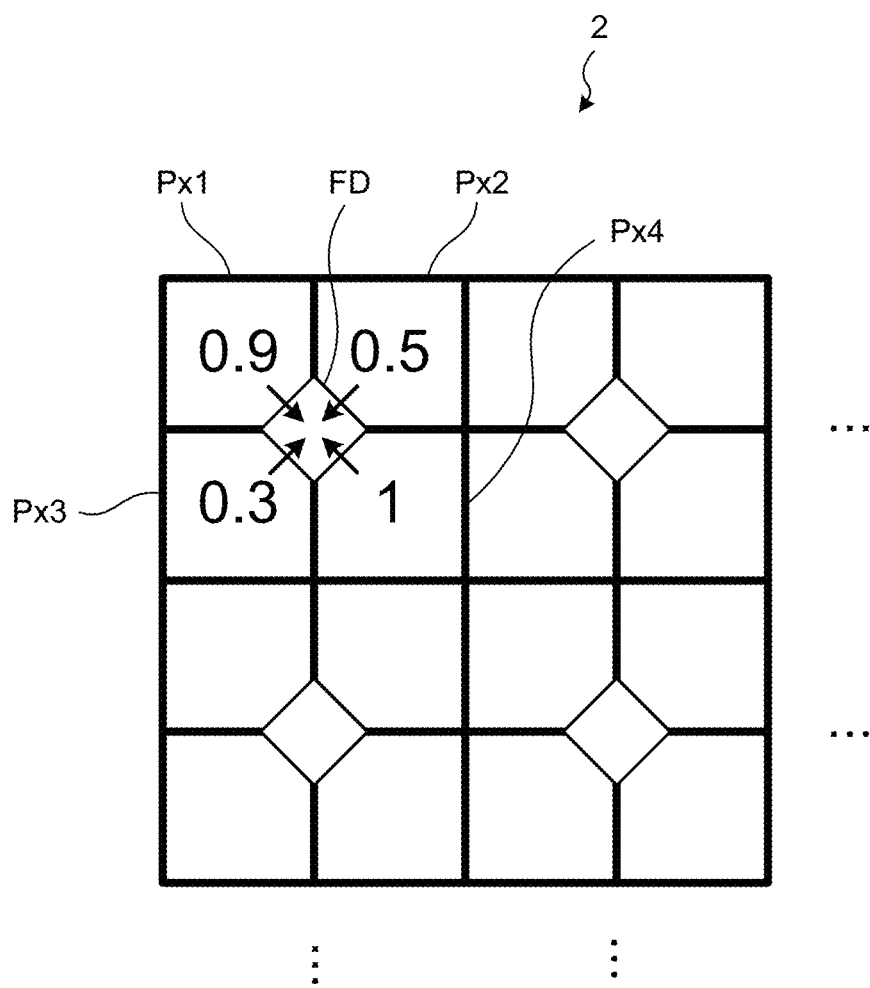
FIG. 3 is an explanatory diagram of 2×2 Conv according to the present disclosure.

Next, a specific example of 2×2 Conv according to the present disclosure will be described by referring to FIG. 3. FIG. 3 is an explanatory diagram of 2×2 Conv according to the present disclosure. As illustrated in FIG. 3, in the imaging unit 2, one floating diffusion FD is shared by four imaging pixels Px1 to Px4 that are adjacent vertically and horizontally.

In the case of such a configuration, the setting unit 51 sets exposure time corresponding to the convolution coefficient 61 of the first layer in the CNN 8, for example, in an order starting from the four imaging pixels Px1 to Px4 at the upper left corner of the imaging unit 2. In the example illustrated in FIG. 3, an exposure time of 0.9 (msec) is set to the imaging pixel Px1, and an exposure time of 0.5 (msec) is set to the imaging pixel Px2. An exposure time of 0.3 (msec) is set to the imaging pixel Px3, and an exposure time of 1 (msec) is set to the imaging pixel Px4.

The control unit 52 exposes the four imaging pixels Px1 to Px4 so as to have exposure time set by the setting unit 51 and then transfers signal charges from the four imaging pixels Px1 to Px4 to a floating diffusion FD. Then, the control unit 52 causes the ADC 4 to read the signal charges from the floating diffusion FD as pixel signals.

The control unit 52 performs such a series of imaging processes on all the imaging pixels of the imaging unit 2. As a result, the control unit 52 can complete the convolution processing of the first layer of the CNN 8 for the entire image of one frame. Note that, here, the signal charges are added up by transferring the signal charges from the four imaging pixels Px1 to Px4 to the shared floating diffusion PD, however, a floating diffusion may be provided to each of the four imaging pixels Px1 to Px4, and the signal charges may be added up by a source follower addition circuit.

[4. Circuit Configuration for Performing 2×2 Conv]

Figure 4:
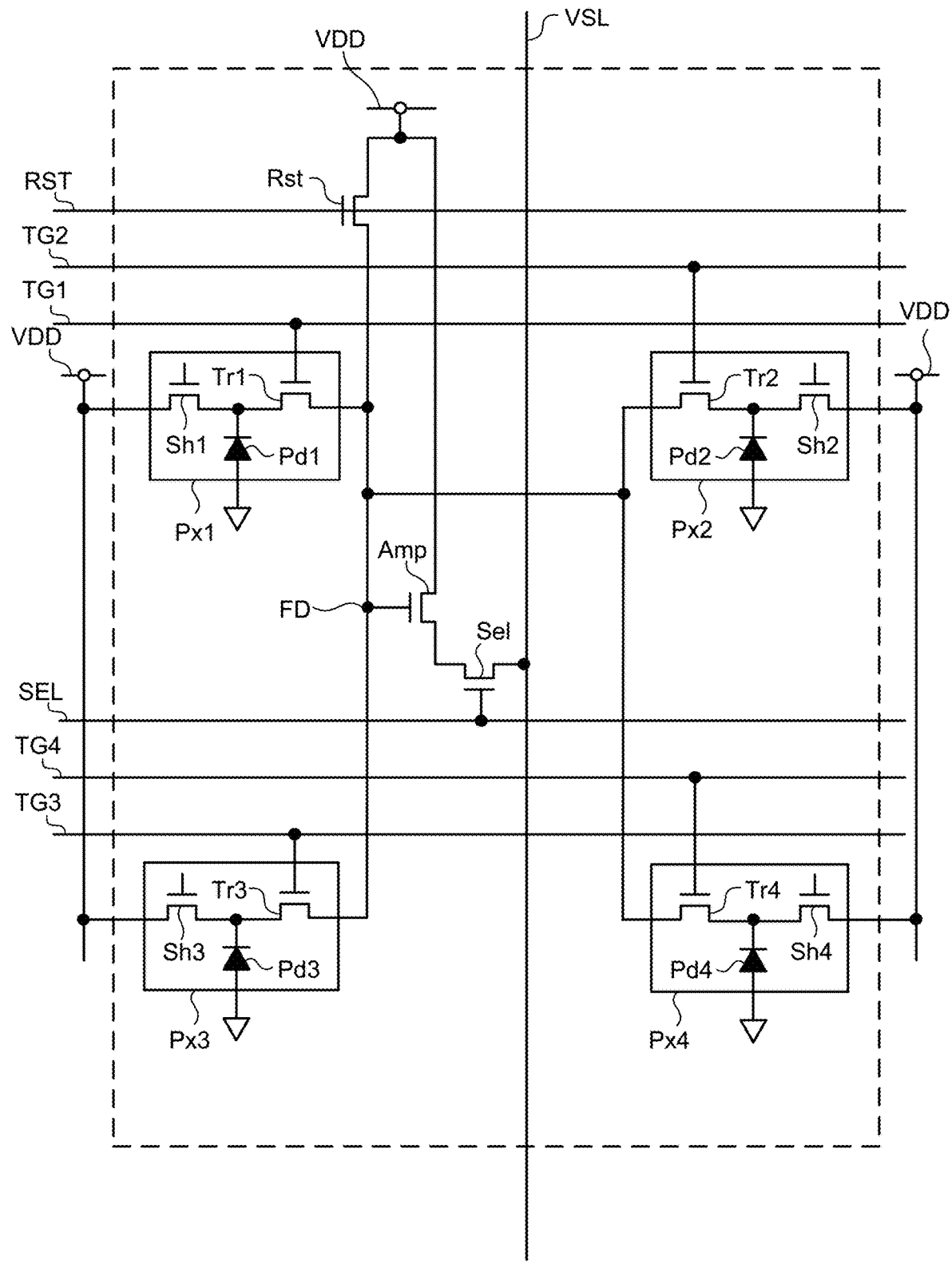
FIG. 4 is an explanatory diagram illustrating an example of a circuit that performs 2×2 Conv according to the present disclosure.

Next, an example of a circuit that enables 2×2 Conv will be described by referring to FIG. 4. FIG. 4 is an explanatory diagram illustrating an example of a circuit that performs 2×2 Conv according to the present disclosure. In FIG. 4, four imaging pixels Px1 to Px4 sharing one floating diffusion FD is illustrated.

As illustrated in FIG. 4, the imaging pixel Px1 includes a photodiode Pd1a, a transfer transistor Tr1, and a shutter transistor Sh1. The imaging pixel Px2 includes a photodiode Pd2, a transfer transistor Tr2, and a shutter transistor Sh2.

Likewise, the imaging pixel Px3 includes a photodiode Pd3, a transfer transistor Tr3, and a shutter transistor Sh3. The imaging pixel Px4 includes a photodiode Pd4, a transfer transistor Tr4, and a shutter transistor Sh4.

The four imaging pixels Px1 to Px4 share a reset transistor Rst, an amplification transistor Amp, a selection transistor Sel, and the floating diffusion FD. Therefore, the photodiodes Pd1 to Pd4 are connected to the floating diffusion FD via the transfer transistors Tr1 to Tr4, respectively. When the reset transistor Rst is turned on in response to a reset signal RST, the floating diffusion 76 is clamped to a predetermined reference potential VDD and reset.

When the transfer transistor Tr1 is turned on in response to a transfer signal TG1, the imaging pixel Px1 transfers a signal charge photoelectrically converted by the photodiode Pd1 to the floating diffusion FD.

When the transfer transistor Tr2 is turned on in response to a transfer signal TG2, the imaging pixel Px2 transfers a signal charge photoelectrically converted by the photodiode Pd2 to the floating diffusion FD.

When the transfer transistor Tr3 is turned on in response to a transfer signal TG3, the imaging pixel Px3 transfers a signal charge photoelectrically converted by the photodiode Pd3 to the floating diffusion FD.

When the transfer transistor Tr4 is turned on in response to a transfer signal TG4, the imaging pixel Px4 transfers a signal charge photoelectrically converted by the photodiode Pd4 to the floating diffusion FD.

As a result, the signal charges photoelectrically converted by the four imaging pixels Px1 to Px4 are added up and accumulated in the floating diffusion FD. Then, when the selection transistor Sel is turned on in response to a selection signal SEL, a pixel signal corresponding to the signal charges accumulated in the floating diffusion FD is output to a vertical signal, line VSL.

In a case where 2×2 Conv is performed by the four imaging pixels Px1 to Px4, first, the floating diffusion FD is reset, and all the four shutter transistors Sh1 to Sh4 are turned on. As a result, the signal charges photoelectrically converted by the four photodiodes Pd1 to Pd4 are reset.

Then, the four imaging pixels Px1 to Px4 are exposed for time corresponding to the convolution coefficient 61. Specifically, the shutter transistors Sh1 to Sh4 are sequentially turned off earlier as the respective imaging pixels Px1 to Px4 have longer exposure time. Then, the four shutter transistors Sh1 to Sh4 are simultaneously turned on.

At this point, the setting unit 51 sets in advance the timing of turning on the four shutter transistors Sh1 to Sh4 so that the time of each of the imaging pixels Px1 to Px4 corresponds to the convolution coefficient 61. As a result, the four imaging pixels Px1 to Px4 can be exposed for time corresponding to the convolution coefficient 61.

Then, as the four shutter transistors Sh1 to Sh4 are turned on, the four transfer transistors Tr1 to Tr4 are simultaneously turned on. As a result, since the signal charges are transferred from the four imaging pixels Px1 to Px4 to the floating diffusion FD in the imaging unit 2, 2×2 Conv can be performed.

[5. Exposure Timing]

Figure 5:
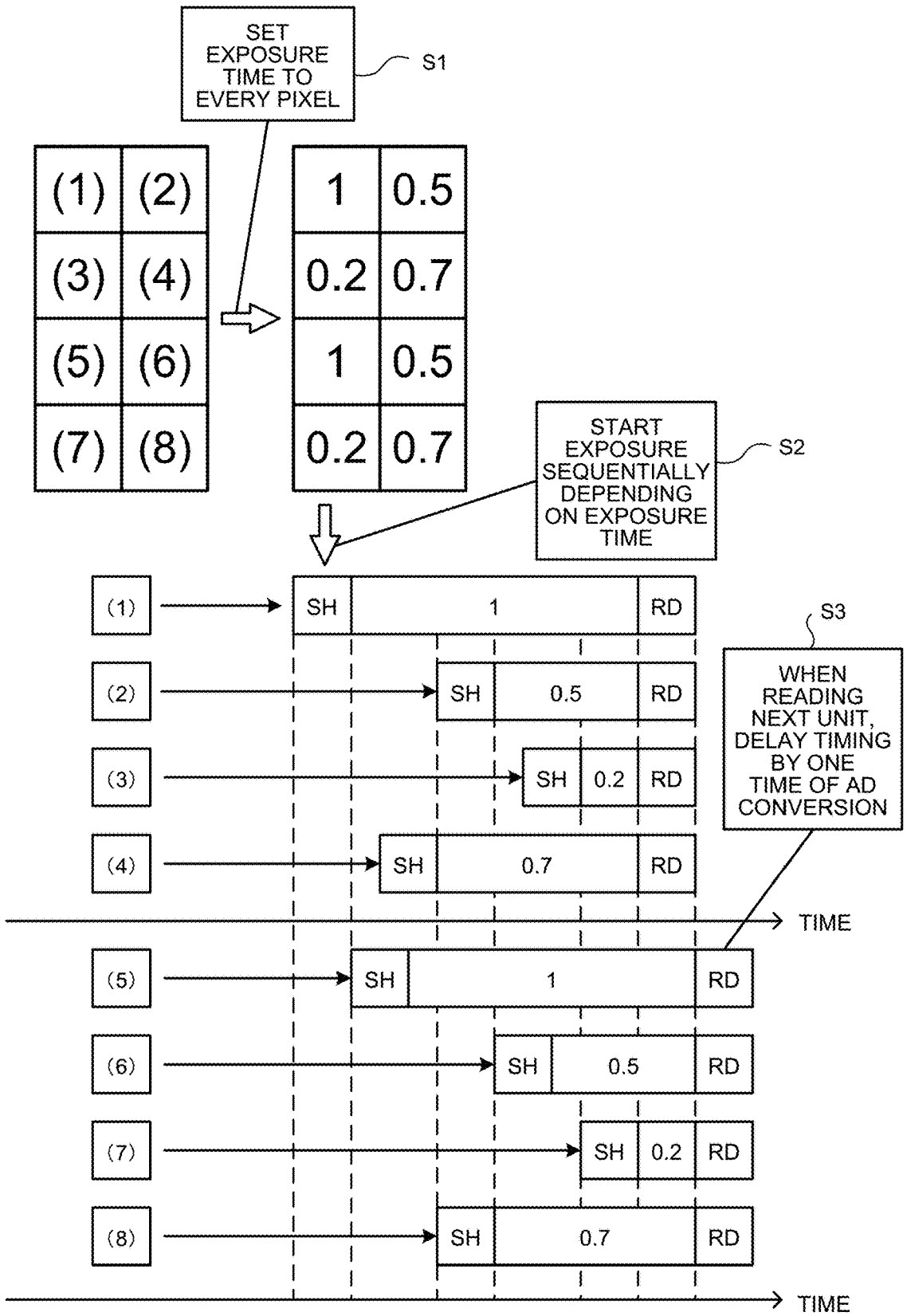
FIG. 5 is an explanatory diagram of exposure and read timing in 2×2 Conv according to the present disclosure.

Next, exposure and reading timing of each imaging pixel will be described by referring to FIG. 5. FIG. 5 is an explanatory diagram of exposure and reading timing in 2×2 Conv according to the present disclosure. Here, a case where 2×2 Conv is performed on eight imaging pixels (1) to (8) arrayed in 2 columns×4 rows illustrated in the upper left of FIG. 5 will be described.

As illustrated in FIG. 5, in a case where 2×2 Conv is performed, the setting unit 51 first sets exposure time for each of the imaging pixels (1) to (8) (step S1). In the example illustrated in FIG. 5, the setting unit 51 sets the exposure time of an imaging pixel (1) to 1 [msec], the exposure time of an imaging pixel (2) to 0.5 [msec], the exposure time of an imaging pixel (3) to 0.2 [msec], and the exposure time of an imaging pixel (4) to 0.7 [msec].

Furthermore, the setting unit 51 sets the exposure time of an imaging pixel (5) to 1 [msec], the exposure time of an imaging pixel (6) to 0.5 [msec], the exposure time of an imaging pixel (7) to 0.2 [msec], and the exposure time of an imaging pixel (8) to 0.7 [msec].

Furthermore, the setting unit 51 sets each of the four imaging pixels (1) to (4) and (5) to (8) as one unit and sets timing at which signal charges are read from the four imaging pixels (1) to (4) and (5) to (8) included in each of the units.

At this time, the setting unit 51 sets the reading timing of the four imaging pixels (1) to (4) to the same timing and sets the exposure start timing so that the exposure time of the imaging pixels (1) to (4) matches the set exposure time by calculating back from the reading timing.

Furthermore, the setting unit 51 similarly sets exposure start timing and read timing for the four imaging pixels (5) to (8) included in the next unit. However, the setting unit 51 delays the read timing of the imaging pixels (5) to (8) by one time of analog-digital conversion by the ADC 4 from the read timing of the imaging pixels (1) to (4).

Then, the control unit 52 sequentially starts exposure in accordance with the exposure time set by the setting unit 51 (step S2). The control unit 52 first starts (SH) exposure of the imaging pixel (1). Then, the control unit 52 starts exposure of the imaging pixel (4) after 0.3 [msec] from the start of the exposure of the imaging pixel (1), starts exposure of the imaging pixel (2) after 0.5 [msec], and starts exposure of the imaging pixel (3) after 0.8 [msec].

Then, after 1 [msec] from the start of exposure of the imaging pixel (1), the control unit 52 causes reading of the signal charges from the four imaging pixels (1) to (4) to the floating diffusion shared by the imaging pixels. As a result, the control unit 52 can perform 2×2 Conv by analog processing for the four imaging pixels (1) to (4).

Furthermore, the control unit 52 starts exposure of the imaging pixel (5) at timing delayed by one time of analog-digital conversion by the ADC 4 from the start of exposure of the imaging pixel (1). Then, the control unit 52 starts exposure of the imaging pixel (8) after 0.3 [msec] from the start of the exposure of the imaging pixel (5), starts exposure of the imaging pixel (6) after 0.5 [msec], and starts exposure of the imaging pixel (7) after 0.8 [msec].

Then, after 1 [msec] from the start of exposure of the imaging pixel (5), the control unit 52 causes reading of the signal charges from the four imaging pixels (5) to (8) to the floating diffusion shared by the imaging pixels.

That is, when reading the next unit, the control unit 52 delays the timing by one time of AD (analog to digital conversion) (step S3). As a result, the ADC 4 can sequentially perform analog-digital conversion on the signal charges read from the floating diffusions. Furthermore, the control unit 52 can perform 2×2 Conv by analog processing for the four imaging pixels (5) to (8).

[6. 4×4 Conv]

Figure 6:
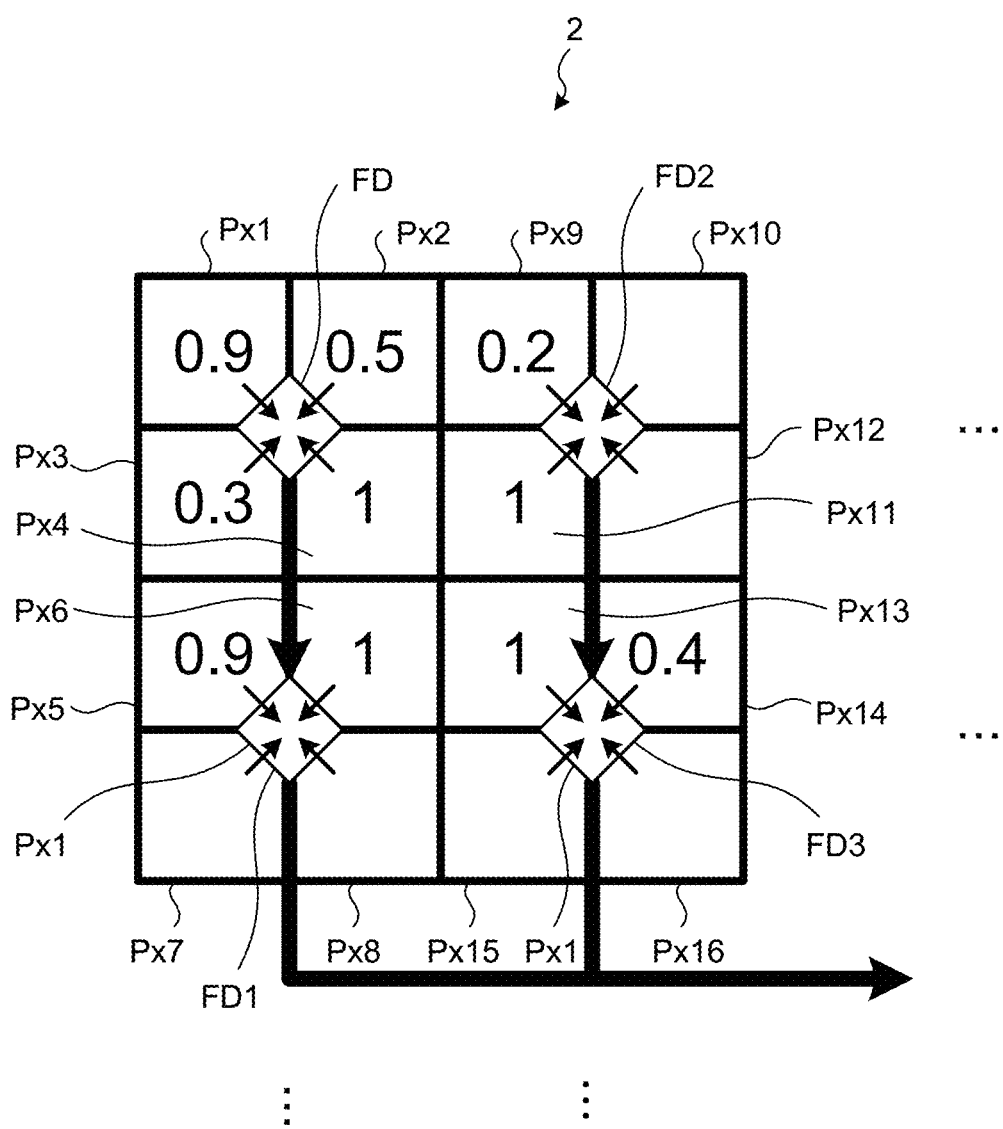
FIG. 6 is an explanatory diagram, of 4×4 Conv according to the present disclosure.

Next, a specific example of the 4×4 Conv according to the present disclosure will be described by referring to FIG. 5. FIG. 6 is an explanatory diagram of 4×4 Conv according to the present disclosure. The controller 5 first performs 2×2 Conv on every four imaging pixels that are adjacent vertically and horizontally and performs 2×2 Conv on the four 2×2 Conv results, thereby performing 4×4 Conv.

Specifically, as illustrated in FIG. 6, the setting unit 51 first sets exposure time to each of sixteen imaging pixels Px1 to Px8 of 4×4 in height and width. Then, the control unit 52 exposes each of the sixteen imaging pixels Px1 to Px8 for exposure time that has been set.

Then, the control unit 52 performs 2×2 Conv on every four imaging pixels of 2×2 in height and width. For example, the control unit 52 transfers the signal charges photoelectrically converted by the four imaging pixels Px1 to Px4 to the floating diffusion FD and transfers the signal charges photoelectrically converted by the four imaging pixels Px5 to Px8 to a floating diffusion FD1.

Furthermore, the control unit 52 transfers the signal charges photoelectrically converted by the four imaging pixels Px9 to Px12 to a floating diffusion FD2 and transfers the signal charges photoelectrically converted by the four imaging pixels Px13 to Px16 to a floating diffusion FD3. Then, the control unit 52 transfers the signal charges transferred to the four floating diffusions FD to FD3 to, for example, one charge holding region separately provided and adds up the signal charges.

At this time, the control unit 52 multiplies the charge amount of the signal charges held in the four floating diffusions FD to FD3 by a convolution coefficient of the second layer in the CNN 8 and transfers the signal charges to one charge holding region. Note that an example of a circuit configuration for multiplying the charge amount of the signal charges held in the floating diffusions FD to FD3 by the convolution coefficient of the second layer in the CNN 8 will be described later by referring to FIG. 7.

As a result, the control unit 52 can perform 4×4 Conv by analog processing. Note that one charge holding region is connected to the gate of the amplification transistor Amp (see FIG. 4). As a result, the control unit 52 can cause the ADC 4 to read pixel signals corresponding to the result of 4×4 Conv by turning on the selection transistor Se1 (see FIG. 4).

[7. Circuit Configuration for Performing 4×2 Conv]

Figure 7:
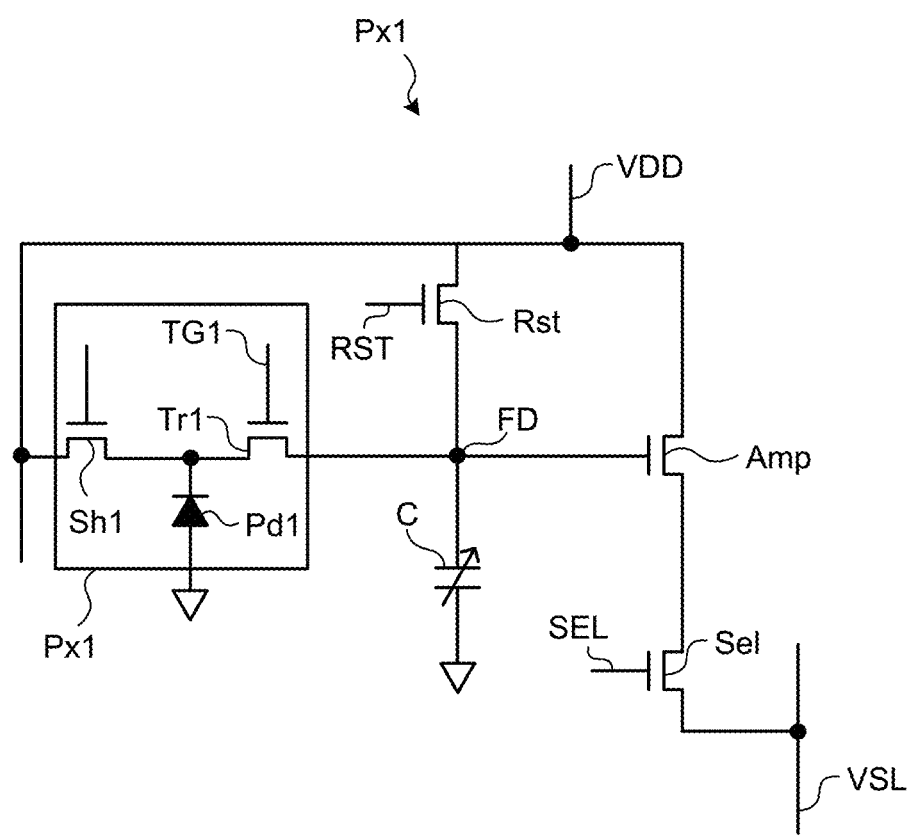
FIG. 7 is an explanatory diagram illustrating an example of a circuit that performs 4×4 Conv according to the present disclosure.

Next, an example of a circuit that enables 4×4 Conv will be described by referring to FIG. 7. FIG. 7 is an explanatory diagram illustrating an example of a circuit that performs 4×4 Conv according to the present disclosure. Note that the floating diffusions FD to FD3 each have the same the circuit configuration for multiplying the charge amount of signal charges that are held by the convolution coefficient of the second layer in the CNN 8.

Therefore, here, description will be given on a circuit configuration in which the charge amount of signal charges held in the floating diffusion FD illustrated in FIGS. 4 and 6 is multiplied by the convolution coefficient of the second layer in the CNN 8. Here, among the components illustrated in FIG. 7, a component same as that illustrated in FIG. 4 is denoted by the same symbol as that illustrated in FIG. 4, and redundant description will be omitted.

In FIG. 7, the floating diffusion FD shared by the four imaging pixels Px1 to Px4, the reset transistor Rst, the amplification transistor Amp, the selection transistor Se1, and the imaging pixel Px1 are selectively illustrated. Furthermore, although not illustrated here, the imaging pixels Px2 to Px4 are connected to the floating diffusion FD.

As illustrated in FIG. 7, in the circuit that enables 4×4 Conv, a variable capacitance C is connected between the floating diffusion ED and the ground. When the electrostatic capacitance of the variable capacitance C varies, the sensitivity of the voltage relative to the amount of change in a charge transferred to the floating diffusion FD (amount of change in voltage: conversion efficiency of the floating diffusion ED) varies.

The conversion efficiency of the floating diffusion FD increases as the electrostatic capacitance of the variable capacitance C decreases and decreases as the electrostatic capacitance increases. Therefore, the setting unit 51 sets the conversion efficiency of the floating diffusion FD to a conversion efficiency corresponding to the convolution coefficient 61 of the second layer of the CNN 8 by changing the setting of the electrostatic capacitance of the variable capacitance C.

Then, the control unit 52 performs convolution processing by adding up signal charges transferred to a predetermined number of floating diffusions (here, four floating diffusions ED to FD3) arrayed two-dimensionally. As a result, the control unit 52 can cause the imaging unit 2 to perform 4×4 Conv by analog Processing. Note that, in a case where convolution processing of a third layer in the CNN is performed by analog processing, for example, a circuit configuration is added in which voltages corresponding to four results of the 4×4 Conv are each amplified to be a multiple of a convolution coefficient of the third layer in the CNN, and a circuit configuration for adding by a source follower addition circuit is added. As a result, the convolution processing of the third layer in the CNN can be performed by analog processing. The convolution processing of the fourth and subsequent layers in the CNN can also be implemented by adding a similar circuit configuration.

[8. Processing Executed by Controller]

Figure 8:
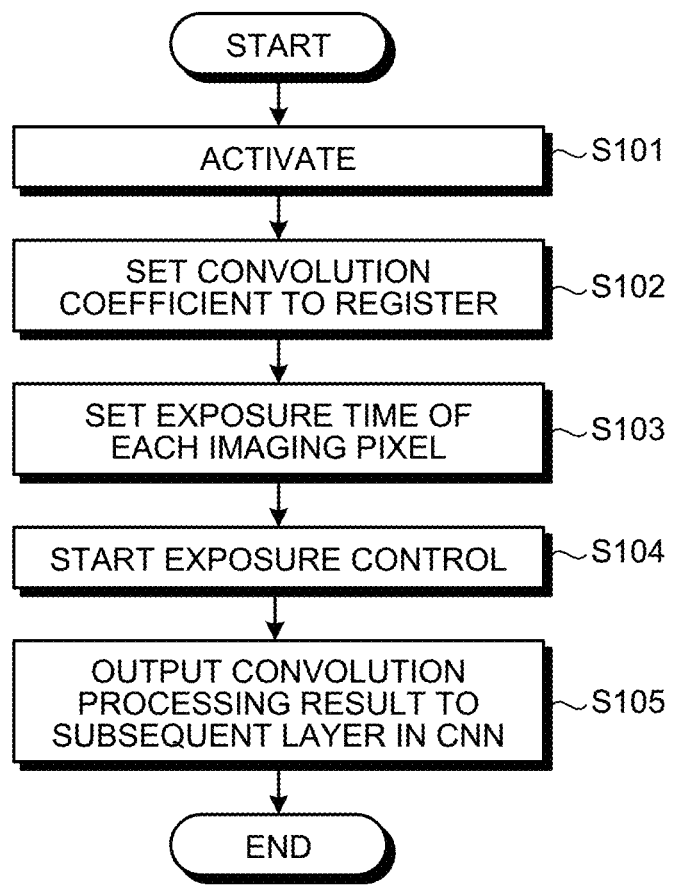
FIG. 8 is a flowchart illustrating an example of process executed by a controller according to the present disclosure.

Next, an example of processing executed by the controller 5 according to the present disclosure will be described by referring to FIG. 8. FIG. 8 is a flowchart illustrating an example of process executed by the controller 5 according to the present disclosure. When the power is turned on, the controller 5 executes the processing illustrated in FIG. 5.

Specifically, as illustrated in FIG. 8, the setting unit 51 is activated when the power is turned on (step S101) and sets the convolution coefficient 61 in the register 7 (step S102). Subsequently, the setting unit 51 sets exposure time of each imaging pixel (step S103).

Thereafter, the control unit 52 starts exposure control of each imaging pixel so that the exposure time of each imaging pixel equals the exposure time set by the setting unit 51 (step S104), causes the convolution processing result to be output to a subsequent layer in the CNN 8 (step S105), and ends the processing.

[9. Application Example to Mobile Body]

The technology according to the present disclosure (present technology) can be applied to various products. For example, the technology according to the present disclosure may be implemented as a device to be mounted on a mobile body of any type such as an automobile, an electric vehicle, a hybrid electric vehicle, a motorcycle, a bicycle, a personal mobility, an airplane, a drone, a ship, and a robot.

Figure 9:
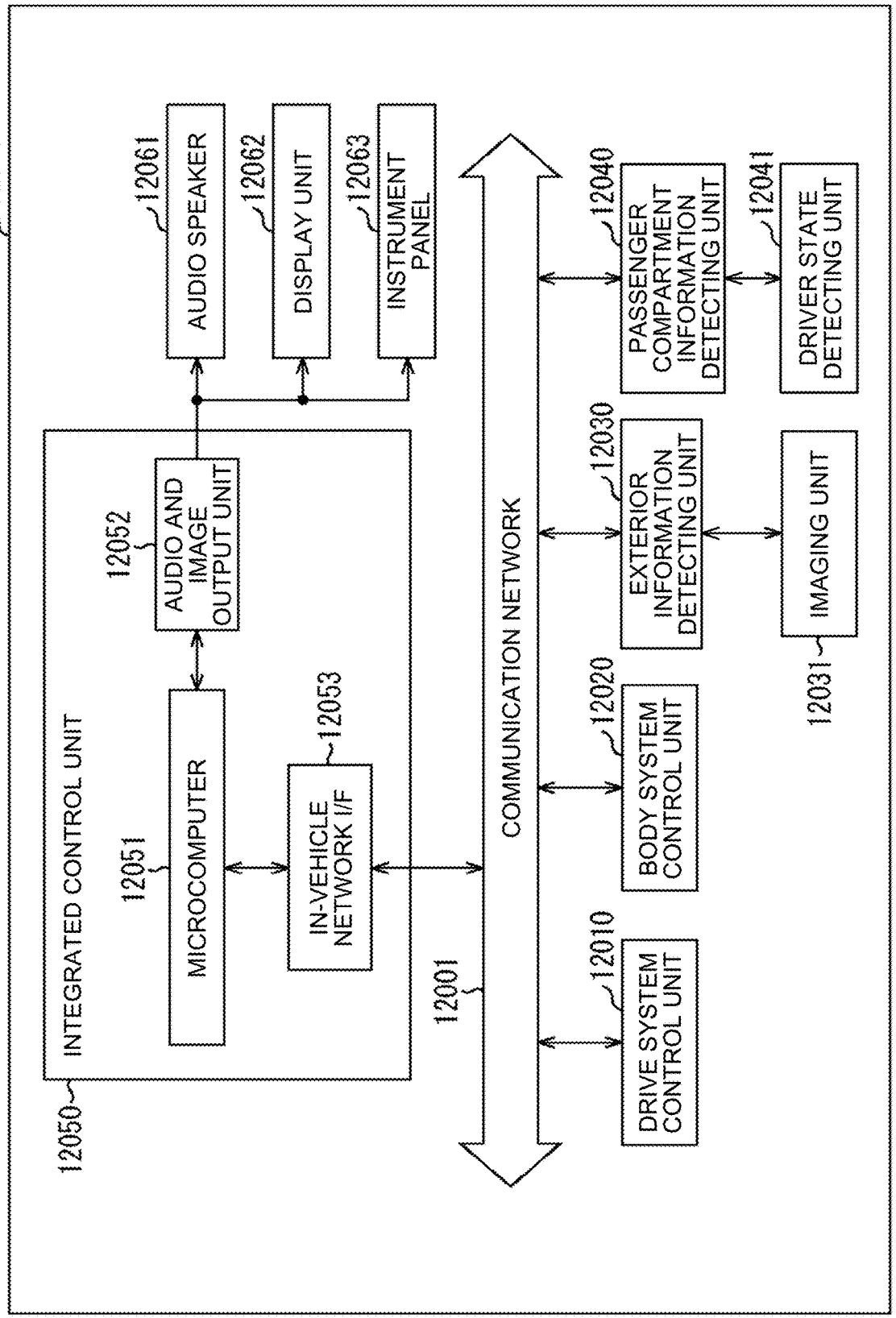
FIG. 9 is a block diagram illustrating an example of a schematic configuration of a vehicle control system.

FIG. 9 is a block diagram illustrating a schematic configuration example of a vehicle control system which is an example of a mobile body control system to which the technology according to the present disclosure can be applied.

A vehicle control system 12000 includes a plurality of electronic control units connected via a communication network 12001. In the example illustrated in FIG. 9, the vehicle control system 12000 includes a drive system control unit 12010, a body system control unit 12020, an exterior information detecting unit 12030, a passenger compartment information detecting unit 12040, and an integrated control unit 12050. Furthermore, as a functional configuration of the integrated control unit 12050, a microcomputer 12051, an audio and image output unit 12052, and an in-vehicle network interface (I/F) 12053 are illustrated.

The drive system control unit 12010 controls the operation of devices related to the drive system of the vehicle in accordance with various programs. For example, the drive system control unit 12010 functions as a control device of a driving force generation device for generating a driving force of the vehicle such as an internal combustion engine or a driving motor, a driving force transmission mechanism for transmitting the driving force to wheels, a steering mechanism for adjusting a steering angle of the vehicle, a braking device for generating a braking force of the vehicle, and the like.

The body system control unit 12020 controls the operation of various devices mounted on the vehicle body in accordance with various programs. For example, the body system control unit 12020 functions as a control device of a keyless entry system, a smart key system, a power window device, or various lamps such as a head lamp, a rear lamp, a brake lamp, a blinker, or a fog lamp. In this case, radio waves transmitted from a portable device that substitutes for a key or signals of various switches can be input to the body system control unit 12020. The body system control unit 12020 accepts input of these radio waves or signals and controls a door lock device, a power window device, a lamp, and the like of the vehicle.

The exterior information detecting unit 12030 detects information exterior to the vehicle on which the vehicle control system 12000 is mounted. For example, an imaging unit 12031 is connected to the exterior information detecting unit 12030. The exterior information detecting unit 12030 causes the imaging unit 12031 to capture an image of the outside of the vehicle and receives the captured image. The exterior information detecting unit 12030 may perform object detection processing or distance detection processing of a person, a vehicle, an obstacle, a sign, characters on a road surface, or the like on the basis of the image received.

The imaging unit 12031 is an optical sensor that receives light and outputs an electric signal corresponding to the amount of received light. The imaging unit 12031 can output the electric signal as an image or can output the electric signal as ranging information. Furthermore, the light received by the imaging unit 12031 may be visible light or invisible light such as infrared rays.

The passenger compartment information detecting unit 12040 detects information inside the passenger compartment information detecting unit. For example, a driver state detecting unit 12041 that detects the state of a driver is connected to the passenger compartment information detecting unit 12040. The driver state detecting unit 12041 includes, for example, a camera that images the driver, and the passenger compartment information detecting unit 12040 may calculate the degree of fatigue or the degree of attention of the driver or may determine whether or not the driver is dozing off on the basis of detection information input from the driver state detecting unit 12041.

The microcomputer 12051 can calculate a control target value of the driving force generation device, the steering mechanism, or the braking device on the basis of information inside and outside the vehicle acquired by the exterior information detecting unit 12030 or the passenger compartment information detecting unit 12040 and output a control command to the drive system, control unit 12010. For example, the microcomputer 12051 can perform cooperative control for the purpose of implementing functions of an advanced driver assistance system (ADAS) including collision avoidance or impact mitigation of the vehicle, follow-up traveling based on an inter-vehicle distance, constant speed traveling, collision warning of the vehicle, lane deviation warning of the vehicle, or the like.

Furthermore, the microcomputer 12051 can perform cooperative control for the purpose of automatic driving or the like in which the vehicle autonomously travels without depending on the operation of the driver by controlling the driving force generation device, the steering mechanism, the braking device, or the like on the basis of information around the vehicle acquired by the exterior information detecting unit 12030 or the passenger compartment information detecting unit 12040.

The microcomputer 12051 can also output a control command to the body system control unit 12020 on the basis of exterior information acquired by the exterior information detecting unit 12030. For example, the microcomputer 12051 can perform cooperative control for the purpose of preventing glare, such as switching from a high beam to a low beam, by controlling the headlamp depending on the position of a preceding vehicle or an oncoming vehicle detected by the exterior information detecting unit 12030.

The audio and image output unit 12052 transmits an output signal of at least one of sound or an image to an output device capable of visually or audibly notifying information to a passenger of the vehicle or the outside of the vehicle. In the example of FIG. 9, an audio speaker 12061, a display unit 12062, and an instrument panel 12063 are illustrated as examples of the output device. The display unit 12062 may include, for example, at least one of an on-board display and a head-up display.

Figure 10:
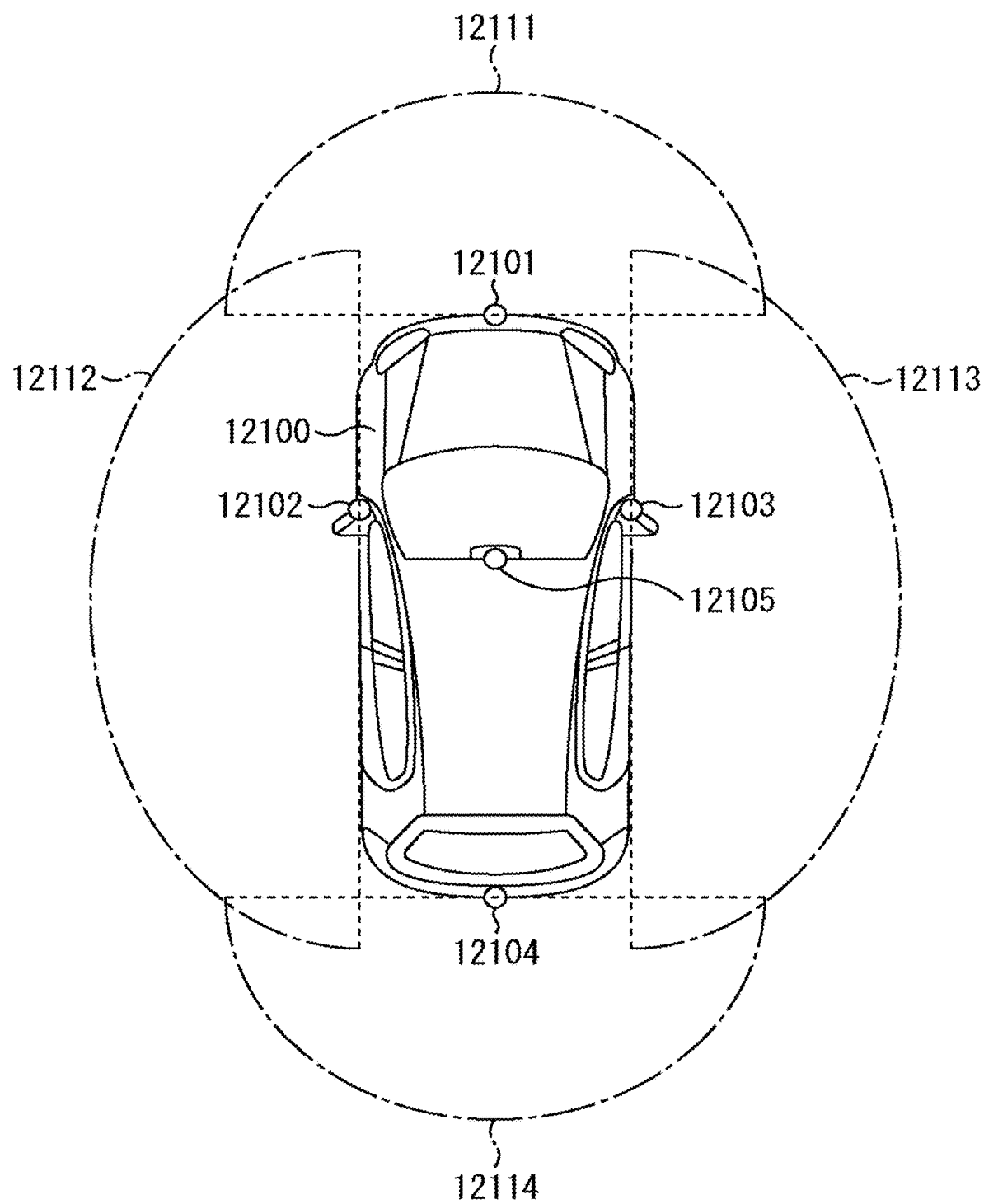
FIG. 10 is an explanatory diagram illustrating an example of installation positions of an exterior information detecting unit and imaging units.

FIG. 10 is a diagram illustrating an example of installation positions of the imaging unit 12031.

In FIG. 10, a vehicle 12100 includes imaging units 12101, 12102, 12103, 12104, and 12105 as the imaging unit 12031.

The imaging units 12101, 12102, 12103, 12104, and 12105 are provided, for example, at positions such as the front nose, the side mirrors, the rear bumper, the rear door, and an upper portion of the windshield in the passenger compartment of the vehicle 12100. The imaging unit 12101 provided at the front nose and the imaging unit 12105 provided at the upper portion of the windshield in the passenger compartment mainly acquire images ahead of the vehicle 12100. The imaging units 12102 and 12103 provided at the side mirrors mainly acquire images beside the vehicle 12100. The imaging unit 12104 provided at the rear bumper or the rear door mainly acquires an image behind the vehicle 12100. The images ahead of the vehicle acquired by the imaging units 12101 and 12105 are mainly used for detection of preceding vehicles, pedestrians, obstacles, traffic lights, traffic signs, lanes, or the like.

Note that an example of imaging ranges of the imaging units 12101 to 12104 is illustrated in FIG. 10. An imaging range 12111 indicates an imaging range of the imaging unit 12101 provided at the front nose, imaging ranges 12112 and 12113 indicate imaging ranges of the imaging units 12102 and 12103 provided at the side mirrors, respectively, and an imaging range 12114 indicates an imaging range of the imaging unit 12104 provided at the rear bumper or the rear door. For example, by superimposing image data captured by the imaging units 12101 to 12104, an overhead image of the vehicle 12100 as viewed from above is obtained.

At least one of the imaging units 12101 to 12104 may have a function of acquiring distance information. For example, at least one of the imaging units 12101 to 12104 may be a stereo camera including a plurality of imaging elements or may be an imaging element having pixels for phase difference detection.

For example, the microcomputer 12051 can extract, as a preceding vehicle, in particular the closest three-dimensional object on a traveling path of the vehicle 12100 and is traveling at a specified speed (for example, 0 km/h or faster) in substantially the same direction as the vehicle 12100 by obtaining a distance to each three-dimensional object in the imaging ranges 12111 to 12114 and a temporal change of the distance (relative speed with respect to the vehicle 12100) on the basis of distance information obtained from the imaging units 12101 to 12104. Furthermore, the microcomputer 12051 can set in advance an inter-vehicle distance to be secured ahead of the preceding vehicle and perform automatic brake control (including follow-up stop control), automatic acceleration control (including follow-up start control), and the like. As described above, it is possible to perform cooperative control for the purpose of automatic driving or the like in which the vehicle autonomously travels without depending on the operation of the driver.

For example, on the basis of the distance information obtained from the imaging units 12101 to 12104, the microcomputer 12051 can classify three-dimensional object data related to three-dimensional objects into two-wheeled vehicles, ordinary vehicles, large vehicles, pedestrians, and other three-dimensional objects such as utility poles and extract from the three-dimensional object data for use in automatic avoidance of obstacles. For example, the microcomputer 12051 distinguishes obstacles around the vehicle 12100 between obstacles that the driver of the vehicle 12100 can be visually recognize and obstacles that are difficult to visually recognize. Then, the microcomputer 12051 determines a collision risk indicating the degree of risk of collision with each obstacle, and in a situation where the collision risk is greater than or equal to a set value and there is a possibility of collision, the microcomputer 12051 can perform driving assistance for collision avoidance by outputting an alarm to the driver via the audio speaker 12061 or the display unit 12062 or performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether or not a pedestrian is included in the captured images of the imaging units 12101 to 12104. Such recognition of a pedestrian is performed by, for example, a procedure of extracting feature points in captured images of the imaging units 12101 to 12104 as infrared cameras and a procedure of performing pattern matching processing on a series of feature points indicating the outline of an object and determining whether or not the object is a pedestrian. When the microcomputer 12051 determines that a pedestrian is included in the captured images of the imaging units 12101 to 12104 and recognizes the pedestrian, the audio and image output unit 12052 controls the display unit 12062 to superimpose and display a square contour line for emphasis on the pedestrian who has been recognized. Furthermore, the audio and image output unit 12052 may control the display unit 12062 to display an icon or the like indicating a pedestrian at a desired position.

An example of a vehicle control system to which the technology according to the present disclosure can be applied has been described above. The technology according to the present disclosure can be applied to, for example, the imaging unit 12031, the driver state detecting unit 12041, and the like among the configurations described above. For example, the imaging unit 2 and the like in FIG. 2 can be applied to the imaging unit 12031 and the driver state detecting unit 12041. By applying the technology according to the present disclosure to the imaging unit 12031, a detection processing load of exterior information can be reduced, and by applying the technology according to the present disclosure to the driver state detecting unit 12041, a detection processing load of passenger compartment information can be reduced.

[10. Application Example to Endoscopic Surgery System]

Moreover, the technology according to the present disclosure (the present technology) may be applied town endoscopic surgery system.

Figure 11:
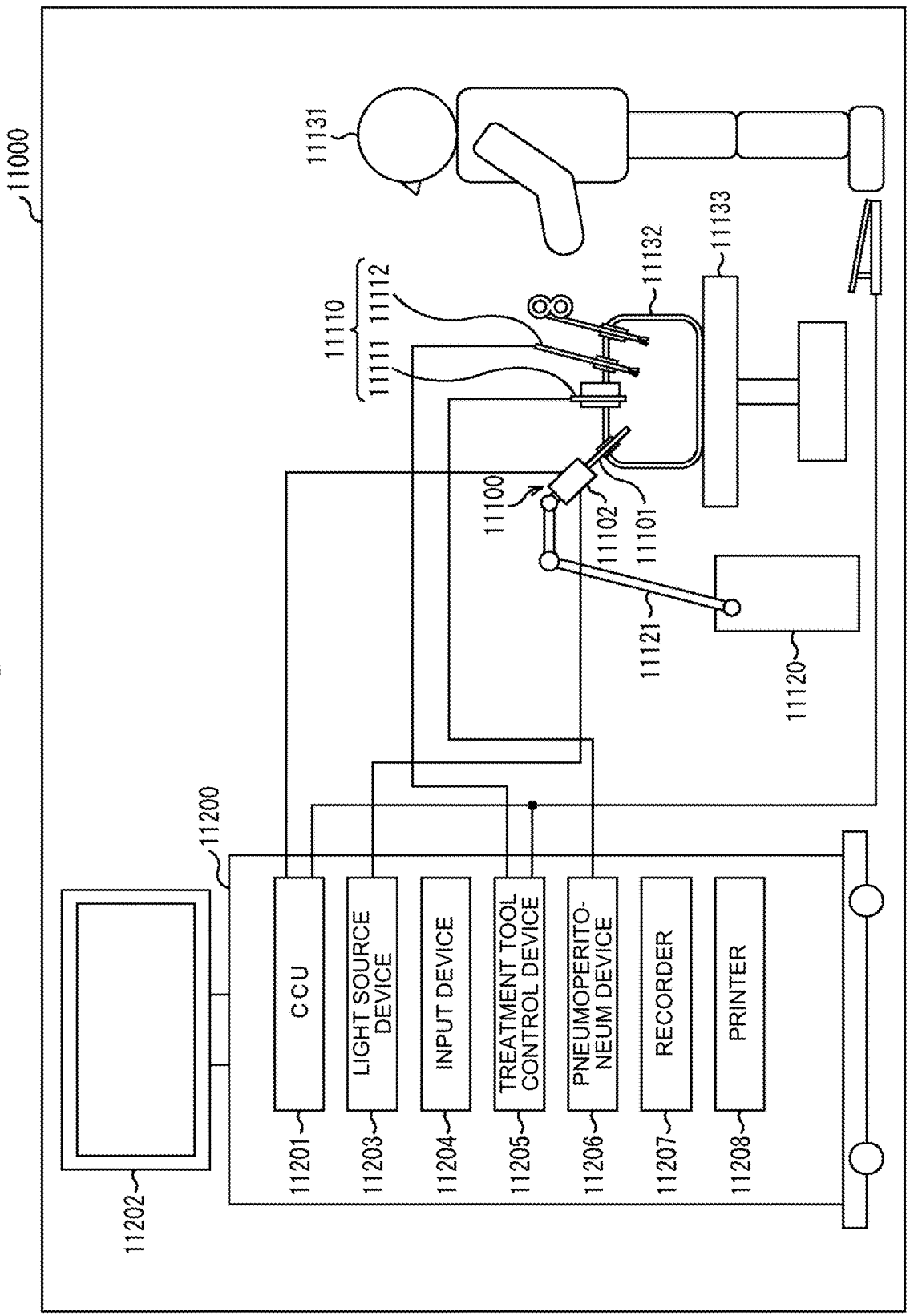
FIG. 11 is a diagram illustrating an example of a schematic configuration of an endoscopic surgery system.

FIG. 11 is a diagram illustrating an example of a schematic configuration of an endoscopic surgery system to which the technology according to the present disclosure (the present technology) can be applied.

In FIG. 11, a scene is illustrated in which a practitioner (surgeon) 11131 is performing surgery on a patient 11132 on a patient bed 11133 using an endoscopic surgery system 11000. As illustrated, the endoscopic surgery system 11000 includes an endoscope 11100, other surgical tools 11110 such as a pneumoperitoneum tube 11111 and an energy treatment tool 11112, a support arm device 11120 that supports the endoscope 11100, and a cart 11200 on which various devices for endoscopic surgery are mounted.

The endoscope 11100 includes a lens barrel 11101 whose region of a predetermined length from the distal end is inserted into a body cavity of the patient 11132 and a camera head 11102 connected to the proximal end of the lens barrel 11101. In the example illustrated, the endoscope 11100 as a so-called rigid scope having the rigid lens barrel 11101 is illustrated, however, the endoscope 11100 may be a so-called flexible scope having a flexible lens barrel.

An opening into which an objective lens is fitted is provided at the distal end of the lens barrel 11101. A light source device 11203 is connected to the endoscope 11100, and light generated by the light source device 11203 is guided to the distal end of the lens barrel by a light guide extending inside the lens barrel 11101 and emitted toward an observation target in the body cavity of the patient 11132 via the objective lens. Note that the endoscope 11100 may be a forward-viewing endoscope, an oblique-viewing endoscope, or a side-viewing endoscope.

An optical system and an imaging element are included inside the camera head 11102, and reflected light (observation light) from the observation target is condensed on the imaging element by the optical system. The observation light is photoelectrically converted by the imaging element, and an electric signal corresponding to the observation light, that is, an image signal corresponding to an observation image is generated. The image signal is transmitted to a camera control unit (CCU) 11201 as RAW data.

The CCU 11201 includes a central processing unit (CPU), a graphics processing unit (GPU), and the like and integrally controls the operation of the endoscope 11100 and a display device 11202. Furthermore, the CCU 11201 receives the image signal from the camera head 11102 and performs various types of image Processing for displaying an image based on the image signal, such as development processing (demosaic processing), on the image signal.

The display device 11202 displays an image based on the image signal having been subjected to the image processing by the CCU 11201 under the control by the CCU 11201.

The light source device 11203 includes a light source such as a light emitting diode (LED) and supplies irradiation light for imaging a surgical site or the like to the endoscope 11100.

An input device 11204 is an input interface for the endoscopic surgery system 11000. A user can input various types of information or instructions to the endoscopic surgery system 11000 via the input device 11204. For example, the user inputs an instruction or the like to change imaging conditions (type, magnification, focal length, and the like of irradiation light) by the endoscope 11100.

A treatment tool control device 11205 controls driving of an energy treatment tool 11112 for cauterization and incision of tissue, sealing of a blood vessel, or the like. A pneumoperitoneum device 11206 feeds gas into the body cavity of the patient 11132 via the pneumoperitoneum tube 11111 in order to inflate the body cavity for the purpose of securing a field of view of the endoscope 11100 and securing a working space of the practitioner. A recorder 11207 is a device capable of recording various types of information related to the surgery. A printer 11208 is a device capable of printing various types of information related to the surgery in various formats such as text, image, or graph.

Note that the light source device 11203 that supplies the endoscope 11100 with the irradiation light for imaging the surgical site can include, for example, an LED, a laser light source, or a white light source including a combination thereof. In a case where the white light source includes a combination of RGB laser light sources, the output intensity and the output timing of each color (each wavelength) can be controlled with high accuracy, and thus the white balance of a captured image can be adjusted in the light source device 11203. Furthermore, in this case, it is also possible to capture images each corresponding to one of RGB in a time division manner by irradiating an observation target with the laser light from each of the RGB laser light sources in a time division manner and controlling driving of the imaging element of the camera head 11102 in synchronization with the irradiation timing. According to this method, a color image can be obtained without providing a color filter in the imaging element.

Furthermore, the driving of the light source device 11203 may be controlled so as to change, for every predetermined time, the intensity of light to be output. It is possible to generate an image of a high dynamic range without so-called blocked up shadows or halation by controlling the driving of the imaging element of the camera head 11102 in synchronization with the timing of the change of the intensity of light to acquire images in a time division manner and synthesizing the images.

Furthermore, the light source device 11203 may be configured to be capable of supplying light in a predetermined wavelength band supporting special light observation. In the special light observation, for example, so-called narrow band imaging is performed in which a predetermined tissue such as a blood vessel in a mucous membrane surface layer is imaged with high contrast by irradiating light in a narrower band than irradiation light (that is, white light) at the time of normal observation using wavelength dependency of light absorption in body tissue. Alternatively, in the special light observation, fluorescence observation for obtaining an image by fluorescence generated by irradiation with excitation light may be performed. In the fluorescence observation, it is possible to, for example, irradiate a body tissue with excitation light to observe fluorescence from the body tissue (autofluorescence observation) or to locally inject a reagent such as indocyanine green (ICG) into a body tissue and irradiate the body tissue with excitation light corresponding to a fluorescence wavelength of the reagent to obtain a fluorescent image. The light source device 11203 can be configured to be capable of supplying narrow band light and/or excitation light supporting such special light observation.

Figure 12:
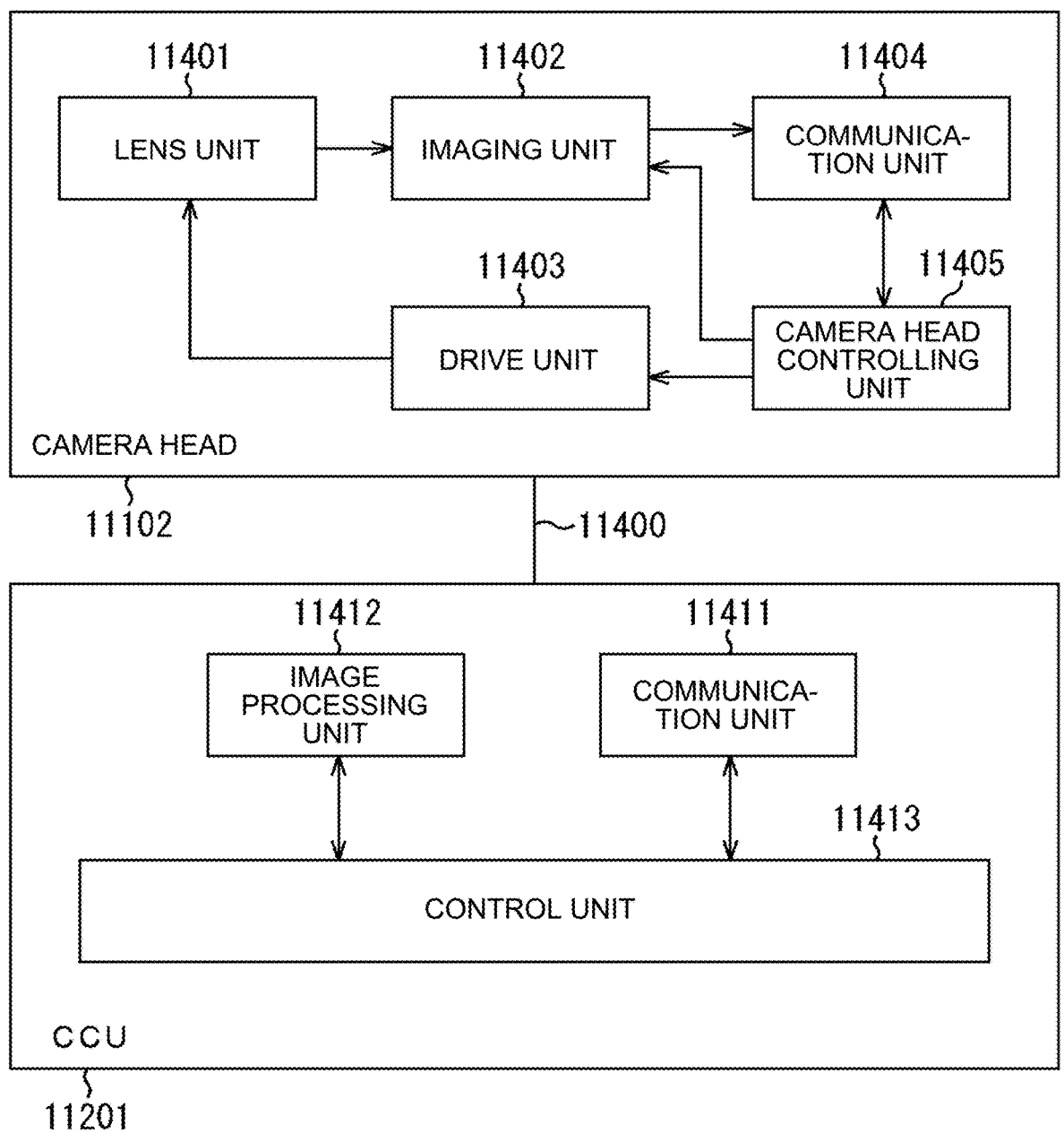
FIG. 12 is a block diagram illustrating an example of the functional configuration of a camera head and a CCU.

FIG. 12 is a block diagram illustrating an example of functional configurations of the camera head 11102 and the CCU 11201 illustrated in FIG. 11.

The camera head 11102 includes a lens unit 11401, an imaging unit 11402, a drive unit 11403, a communication unit 11404, and a camera head controlling unit 11405. The CCU 11201 includes a communication unit 11411, an image processing unit 11412, and a control unit 11413. The camera head 11102 and the CCU 11201 are communicably connected to each other by a transmission cable 11400.

The lens unit 11401 is an optical system provided at a connection portion with the lens barrel 11101. Observation light taken in from the distal end of the lens barrel 11101 is guided to the camera head 11102 and enters the lens unit 11401. The lens unit 11401 is configured by a combination of a plurality of lenses including a zoom lens and a focus lens.

The imaging unit 11402 includes an imaging element. The number of imaging elements included in the imaging unit 11402 may be one (so-called single-plate type) or plural (so-called multi-plate type). In a case where the imaging unit 11402 is a multi-plate type, for example, image signals each corresponding to one of RGB may be generated by one of the imaging elements, and a color image may be obtained by synthesizing the image signals. Alternatively, the imaging unit 11402 may include a pair of imaging elements for acquiring right-eye and left-eye image signals supporting three-dimensional (3D) display. By performing the 3D display, the practitioner 11131 can more accurately grasp the depth of the living tissue in the surgical site. Note that, in a case where the imaging unit 11402 is a multi-plate type, a plurality of lens units 11401 can be provided corresponding to the respective imaging elements.

Furthermore, the imaging unit 11402 may not be necessarily included in the camera head 11102. For example, the imaging unit 11402 may be included immediately subsequent to the objective lens inside the lens barrel 11101.

The drive unit 11403 includes an actuator and moves the zoom lens and the focus lens of the lens unit 11401 by a predetermined distance along the optical axis under the control of the camera head controlling unit 11405. As a result, the magnification and the focal point of an image captured by the imaging unit 11402 can be adjusted as appropriate.

The communication unit 11404 includes a communication device for transmitting and receiving various types of information to and from the CCU 11201. The communication unit 11404 transmits an image signal acquired from the imaging unit 11402 as RAW data to the CCU 11201 via the transmission cable 11400.

Furthermore, the communication unit 11404 receives a control signal for controlling driving of the camera head 11102 from the CCU 11201 and supplies the control signal to the camera head controlling unit 11405. The control signal includes, for example, information regarding imaging conditions such as information for specifying a frame rate of a to-be-captured image, information for specifying an exposure value at the time of imaging, and/or information for specifying the magnification and the focal point of a to-be-captured image.

Note that the imaging conditions such as the frame rate, the exposure value, the magnification, and the focal point may be specified by the user as appropriate or may be automatically set by the control unit 11413 of the CCU 11201 on the basis of the acquired image signal. In the latter case, it means that a so-called auto exposure (AE) function, an auto focus (AF) function, and an auto white balance (AWB) function are installed in the endoscope 11100.

The camera head controlling unit 11405 controls driving of the camera head 11102 on the basis of the control signal from the CCU 11201 received via the communication unit 11404.

The communication unit 11411 includes a communication device for transmitting and receiving various types of information to and from the camera head 11102. The communication unit 11411 receives an image signal transmitted from the camera head 11102 via the transmission cable 11400.

Furthermore, the communication unit 11411 transmits a control signal for controlling driving of the camera head 11102 to the camera head 11102. The image signal and the control signal can be transmitted by electric communication, optical communication, or the like.

The image processing unit 11412 performs various types of image processing on an image signal, which is RAW data, transmitted from the camera head 11102.

The control unit 11413 performs various types of control related to imaging of a surgical site or the like by the endoscope 11100 and display of a captured image obtained by imaging of the surgical site or the like. For example, the control unit 11413 generates a control signal for controlling driving of the camera head 11102.

Furthermore, the control unit 11413 causes the display device 11202 to display a captured image of a surgical site or the like on the basis of the image signal having been subjected to image processing by the image processing unit 11412. At this point, the control unit 11413 may recognize various objects in the captured image using various types of image recognition technology. For example, the control unit 11413 can recognize a surgical tool such as forceps, a certain body part, bleeding, mist at the time of using the energy treatment tool 11112, and the like by detecting the shape, the color, and the like of an edge of an object included in the captured image. When displaying the captured image on the display device 11202, the control unit 11413 may superimpose and display various types of surgery support information on the image of the surgical site by using the recognition result. Since the surgery support information is superimposed for display and presented to the practitioner 11131, it becomes possible to reduce the burden on the practitioner 11131 and to allow the practitioner 11131 to reliably proceed with the surgery.

The transmission cable 11400 connecting the camera head 11102 and the CCU 11201 is an electric signal cable compatible with electric signal communication, an optical fiber compatible with optical communication, or a composite cable thereof.

Here, in the illustrated example, communication is performed by wire using the transmission cable 11400, but communication between the camera head 11102 and the CCU 11201 may be performed wirelessly.

An example of an endoscopic surgery system to which the technology according to the present disclosure can be applied has been described above. The technology according to the present disclosure can be applied to the imaging unit 11402 or the like of the camera head 11102 among the above-described components. Specifically, the imaging unit 2 and the like in FIG. 2 can be applied to the imaging unit 11402. By applying the technology according to the present disclosure to the imaging unit 11402, for example, it is possible to reduce a processing load of various types of object recognition processing in a captured image.

Note that, here, the endoscopic surgery system has been described as an example, however, the technology according to the present disclosure may be applied to other systems, for example, a microscopic surgery system or the like.

[11. Effects]

The information processing device 1 includes the setting unit 51 and the control unit 52. The setting unit 51 sets the exposure time of each of the imaging pixels Px1 to Px4 in the imaging unit 2, which includes the plurality of imaging pixels Px1 to Px4 arrayed two-dimensionally, to exposure time corresponding to the convolution coefficient 61 of the first layer of the CNN 8. The control unit 52 causes transfer of signal charges from the imaging pixels Px1 to Px4, which have been exposed, to the floating diffusion FD, thereby performing convolution processing.

As a result, the information processing device 1 can cause the convolution processing in the first layer in the CNN 8 to be performed by analog processing by the imaging unit 2, and thus the processing load of the convolution processing can be reduced.

Furthermore, the setting unit 51 sets the exposure start timing of the imaging pixels Px1 to Px4 to different timings corresponding to the convolution coefficient 61 of the first layer and sets the transfer timing of signal charges from all the imaging pixels to the floating diffusion FD to the same timing.

As a result, by simultaneously transferring and reading the signal charges from the predetermined number of imaging pixels Px1 to Px4, sharing the floating diffusion FD, to the floating diffusion FD, the information processing device 1 can simplify reading control of signal charges.

Meanwhile, a floating diffusion FD is shared by a predetermined number of imaging elements. The setting unit 51 sets the conversion efficiency of each of the plurality of floating diffusions to a conversion efficiency corresponding to the convolution coefficient 61 of the second layer of the CNN 8. The control unit causes convolution processing to be performed by adding up signal charges transferred to the predetermined number of floating diffusions arrayed two-dimensionally.

As a result, the information processing device 1 can cause the convolution processing in the second layer in the CNN 8 to be performed by analog processing by the imaging unit 2, and thus the processing load of the convolution processing can be reduced.

Furthermore, the information processing device 1 includes the storage unit 6 for storing the convolution coefficient 61 of the CNN 8. The control unit 52 causes the imaging unit 2 to perform convolution processing on the basis of the convolution coefficient 61 stored in the storage unit 6.

As a result, the information processing device 1 can cause the imaging unit 2 to perform various types of different convolution processing in the CNN 8 by analog processing by changing the convolution weighting coefficient to be stored in the storage unit 6.

Furthermore, the control unit 52 outputs a signal corresponding to the result of the convolution processing from the imaging unit to a subsequent layer in the CNN 8.

As a result, the information processing device 1 can reduce the processing amount of arithmetic processing performed in the subsequent layer of the CNN 8.

Meanwhile, an information processing method includes, by a computer, setting the exposure time of each of the imaging pixels in the imaging unit, which includes the plurality of imaging pixels arrayed two-dimensionally, to exposure time corresponding to the convolution coefficient of the first layer of the CNN 8; and causing convolution processing to be performed by transferring signal charges from imaging pixels, which have been exposed, to a floating diffusion.

As a result, the information processing method can cause the convolution processing in the first layer in the CNN 8 to be performed by analog processing by the imaging unit 2, and thus the processing load of the convolution processing can be reduced.

Meanwhile, an information processing program causes a computer to function as: a setting unit for setting the exposure time of each of the imaging pixels in the imaging unit, which includes the plurality of imaging pixels arrayed two-dimensionally, to exposure time corresponding to the convolution coefficient of the first layer of the CNN 8; and a control unit for causing convolution processing to be performed by transferring signal charges from imaging pixels, which have been exposed, to a floating diffusion.

As a result, the program according to the present disclosure can cause the convolution processing in the first layer in the CNN 8 to be performed by analog processing by the imaging unit 2, and thus the processing load of the convolution processing can be reduced.

Note that the effects described herein are merely examples and are not limiting, and other effects may be achieved.

Note that the present technology can also have the following configurations.

(1)

An information processing device including:

a setting unit for setting exposure time of each of imaging pixels in an imaging unit including the plurality of imaging pixels arrayed two-dimensionally to exposure time corresponding to a convolution coefficient of a first layer of a convolutional neural network (CNN); and a control unit for causing convolution processing to be performed by transferring signal charges from the imaging pixels, which have been exposed, to a floating diffusion.

(2)

The information processing device according to (1), wherein the setting unit sets exposure start timing of each of the plurality of imaging pixels to different timings corresponding to the convolution coefficient of the first layer and sets transfer timing of the signal charges from all the plurality of imaging pixels to the floating diffusion to same timing.

(3)

The information processing device according to (1) or (2), wherein the floating diffusion is shared by a predetermined number of the imaging pixels, the setting unit sets a conversion efficiency of each of a plurality of the floating diffusions to a conversion efficiency corresponding to a convolution coefficient of a second layer of the CNN, and the control unit adds up signal charges transferred to the predetermined number of the floating diffusions arrayed two-dimensionally and performs the convolution processing.

(4)

The information processing device according to any one of (1) to (3), further including:

a storage unit for storing the convolution coefficients of the CNN, wherein the control unit causes the imaging unit to perform the convolution processing on a basis of the convolution coefficients stored in the storage unit.

(5)

The information processing device according to any one of (1) to (4), wherein the control unit causes the imaging unit to output a signal corresponding to a result of the convolution processing to a subsequent layer in the CNN.

(6)

An information processing method including the steps of, by a computer:

setting exposure time of each of imaging pixels in an imaging unit including the plurality of imaging pixels arrayed two-dimensionally to exposure time corresponding to a convolution coefficient of a first layer of a CNN; and causing convolution processing to be performed by transferring signal charges from the imaging pixels, which have been exposed, to a floating diffusion.

(7)

An information processing program for causing a computer to function as:

a setting unit for setting exposure time of each of imaging pixels in an imaging unit including the plurality of imaging pixels arrayed two-dimensionally to exposure time corresponding to a convolution coefficient of a first layer of a CNN; and a control unit for causing convolution processing to be performed by transferring signal charges from the imaging pixels, which have been exposed, to a floating diffusion.

REFERENCE SIGNS LIST

1 Information Processing Device
2 Imaging Unit
3 Vertical Scanning Circuit
4 Adc
5 Controller
51 Setting Unit
52 Control Unit
6 Storage Unit
61 Convolution Coefficient
7 Register
8 Cnn
Px1 to Px16 Imaging Pixel
FD to FD3 Floating Diffusion

The invention claimed is:

1. An information processing device comprising:

setting circuitry configured to set exposure time of each of imaging pixels in an imager including a plurality of imaging pixels arrayed two-dimensionally to exposure time corresponding to a convolution coefficient of a first layer of a convolutional neural network (CNN); and control circuitry configured to cause convolution processing to be performed by transferring signal charges from the imaging pixels, which have been exposed, to floating diffusions, wherein each of the floating diffusions is shared by a predetermined number of the imaging pixels, the setting circuitry sets a conversion efficiency of each of the floating diffusions to a conversion efficiency corresponding to a convolution coefficient of a second layer of the CNN, and the control circuitry adds up signal charges transferred to a predetermined number of the floating diffusions arrayed two-dimensionally and performs the convolution processing.

2. The information processing device according to claim 1, wherein the setting circuitry sets exposure start timing of each of the plurality of imaging pixels to a different timing corresponding to the convolution coefficient of the first layer and sets timing for transferring the signal charges from all the predetermined number of the imaging pixels to the floating diffusion shared thereby, to the same timing.

3. The information processing device according to claim 1, further comprising:

a memory for storing the convolution coefficient of the CNN, wherein the control circuitry causes the imager to perform the convolution processing on the basis of the convolution coefficient stored in the memory.

4. The information processing device according to claim 1, wherein the control circuitry causes the imager to output a signal corresponding to a result of the convolution processing to a subsequent layer in the CNN.

5. An information processing method comprising the steps of, by a computer:

setting exposure time of each of imaging pixels in an imager including a plurality of imaging pixels arrayed two-dimensionally to exposure time corresponding to a convolution coefficient of a first layer of a CNN; and causing convolution processing to be performed by transferring signal charges from the imaging pixels, which have been exposed, to floating diffusions, wherein each of the floating diffusions is shared by a predetermined number of the imaging pixels, a conversion efficiency of each of the floating diffusions is set to a conversion efficiency corresponding to a convolution coefficient of a second layer of the CNN, and signal charges transferred to a predetermined number of the floating diffusions arrayed two-dimensionally are added up to perform the convolution processing.

6. A non-transitory computer-readable medium storing an information processing program for causing a computer to function as:

setting circuitry configured to set exposure time of each of imaging pixels in an imager including a plurality of imaging pixels arrayed two-dimensionally to exposure time corresponding to a convolution coefficient of a first layer of a CNN; and control circuitry configured to cause convolution processing to be performed by transferring signal charges from the imaging pixels, which have been exposed, to floating diffusions, wherein each of the floating diffusions is shared by a predetermined number of the imaging pixels, the setting circuitry sets a conversion efficiency of each of the floating diffusions to a conversion efficiency corresponding to a convolution coefficient of a second layer of the CNN, and the control circuitry adds up signal charges transferred to a predetermined number of the floating diffusions arrayed two-dimensionally and performs the convolution processing.

\* \* \* \* \*